Nov. 2, 1943.    R. E. CROW    2,333,153
ATTACHMENT FOR GRAIN HARVESTERS
Filed Nov. 7, 1942
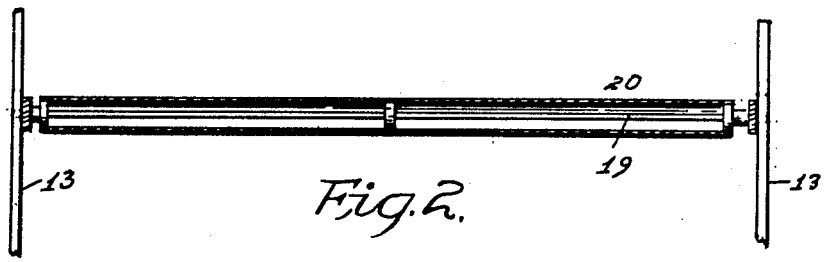
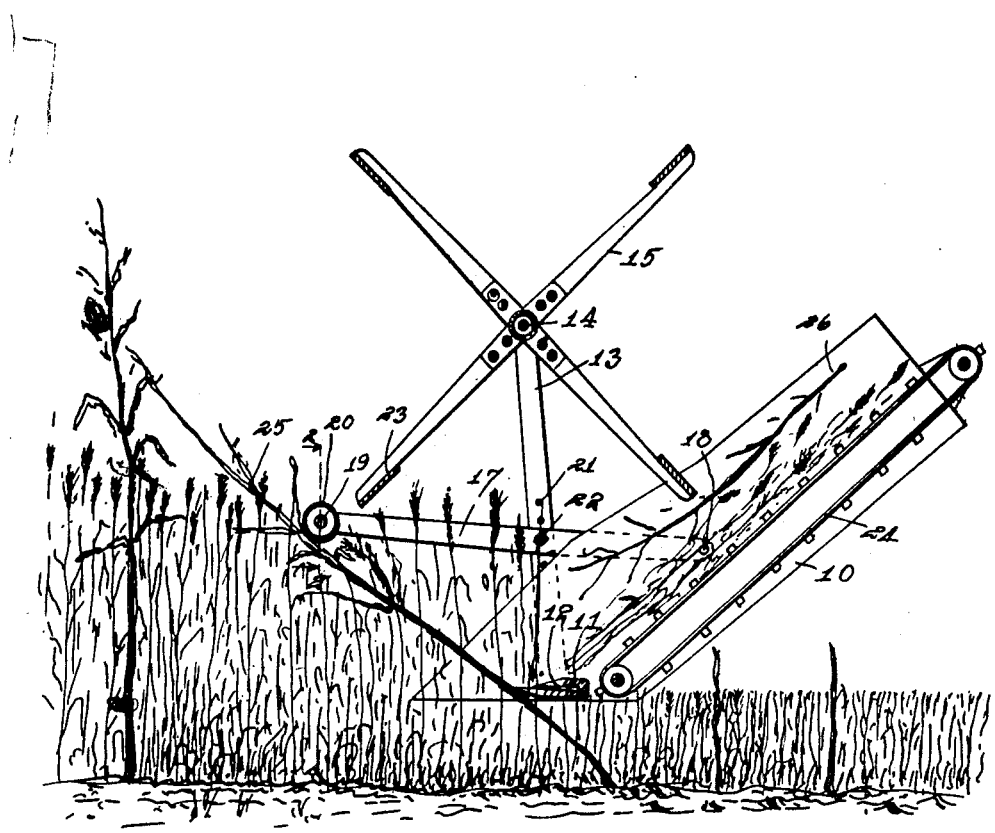
Inventor.
Russell. E. Crow.
by Alfred G. Hague Patented Nov. 2, 1943

2,333,153

UNITED STATES PATENT OFFICE 2,333,153

ATTACHMENT FOR GRAIN HARVESTERS

Russell E. Crow, Prole, Iowa

Application November 7, 1942, Serial No. 464,876

2 Claims. (Cl. 56—1)

This invention relates to improvements in grain harvesters and particularly that type commonly known as grain binders or combined harvesters and threshers, the improvement being particularly adapted to be used in connection with a combined harvester and thresher which employs a cutter bar having a horizontally arranged cutter for severing the top portions of the plants from the root portions, and in connection therewith elevating or conveying means for delivering the severed grain to the thresher, and also a reel for throwing the heads of the grain rearwardly at the time the upper portion of the stalks are severed from the lower portions, so that the heads of the grain may be delivered to the thresher in advance of the butt ends of the stalks.

Considerable difficulty has been experienced in this type of harvester when large and tall weeds are grown with the grain, which become entangled in the reel and cause trouble, and even if severed from the roots the weeds are delivered top first to the thresher, causing considerable difficulty in the feeding of the material to the thresher due to the fact that the comparatively large branches or limbs are projected forwardly, which catch in the various parts of the threshing mechanism.

It is, therefore, the object of my invention to provide in a harvester of the type above described, improved means of simple, durable construction which may be easily and quickly attached to the harvester, and when so attached, will cause the tops of the tall weeds to be shoved forwardly in advance of the reel and to be severed while in the said forwardly inclined position, permitting the weeds to pass under the reel and to the thresher butt ends first.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a vertical central sectional view of the forward end of a combine and of the cutter bar and the reel carried thereby, showing the manner in which my improved device is attached thereto, which is also in section; and Figure 2 is a detail sectional view taken on the line 2—2 of Figure 1.

The numeral 10 indicates the frame member of the gathering mechanism of a combined harvester and thresher having at its lower end the usual cutter bar 11 in which is mounted the cutter 12. Carried by the frame member 10 are reel supports 13. Supported on the upper ends of the members 13 is a shaft 14 on which is mounted a reel 15, of the ordinary construction. Adjustably mounted on each of the members 13 is a forwardly extending arm 17, the rear end of each of the arms 17 being pivotally connected to the frame member 10 by means of a pivot member 18. Supported by the forward ends of the arms 17 is a shaft 19 supporting a roller 20, the said shaft 19 and roller 20 being supported ahead of the reel 15 substantially as illustrated in Figure 1.

The members 13 are each provided with openings 21 for receiving bolts 22 by means of which the forward ends of the arms 17 may be elevated and lowered.

From the above described construction it will be seen that as the harvester is advanced, the roller 20 will pass over the tops of the grain, permitting the tops to be first bent forwardly, after which they assume an upright position to be engaged by the reel plates 23 and moved rearwardly and delivered to the inclined conveyor 24 in the usual manner, the roller being mounted ahead of the reel will engage any tall weeds and cause them to be inclined forwardly, as illustrated at 25, said weeds being severed while in said inclined position so that the weeds will be delivered to an inclined conveyor 24, butts first, as illustrated at 26. The roller 20 provides means whereby the comparatively heavy branches of the weed will be caused to travel beneath the roller without becoming wrapped or entangled thereon and without pulling up the plant. The roller also assists in permitting weeds carried by the grain being harvested, such as morning glories, to pass beneath the roller without winding.

In the drawing I have illustrated the device as harvesting grain, such as wheat. The device, however, is equally well adapted for the harvesting of soy beans and other such crops.

Thus, it will be seen I have provided an attachment of simple, durable and inexpensive construction which may be easily and quickly applied to the ordinary combined harvester and thresher, and when so applied the large and bushy weeds will be bent forwardly as the device is advanced over the ground surface and the stalks severed while inclined, so as to permit the stalk to be fed to the thresher butt end first, the stalk being pushed ahead of the reel so as not to be entangled therein and wrapped around the reel slats as the reel is rotated.

I claim as my invention:

1. In a harvester machine having grain elevating means, a cutter and a reel operatively associated with said elevating means, means providing for tall weeds in the grain being moved into said elevating means but first with said reel free of the weeds to direct the grain with its head portions first into said elevating means including deflecting means comprising a pair of supported arms having corresponding ends located forwardly and upwardly from said cutter, means supporting said reel for rotation between said arms, a deflector supported between said arm ends, and means supporting said arms to provide for said reel being rotatable downwardly adjacent the rear side of said deflector.

2. In a harvester machine having grain elevating means, a cutter and a reel for directing grain into said elevating means head first, means providing for tall weeds grown with the grain entering said elevating means butt first including a pair of arms extended forwardly from said elevating means to a position ahead of said cutter, a deflector supported between the forward ends of said arms, means for adjusting said arms so that said deflector is at a height adjacent the head portions of the standing grain, and means supporting said reel for rotation between said arms and adjacent the rear side of said deflector, with said deflector engaging and holding the weeds, as they are cut, in a position bent forwardly away from the reel, with the grain engaging and passing under said deflector and assuming an upright position between said arms in the path of rotatable movement of said reel.

RUSSELL E. CROW.